US011645643B2

(12) United States Patent
Hope et al.

(10) Patent No.: US 11,645,643 B2
(45) Date of Patent: May 9, 2023

(54) SYSTEM FOR HARNESSING A CONNECTED NETWORK TO SECURELY VERIFY A TRANSACTION

(71) Applicant: Bank of America Corporation, Charlotte, NC (US)

(72) Inventors: Christopher Hope, Tonbridge (GB); James McMorrow, London (GB); Sumita Desai, Jacksonville, FL (US); Shehreyar Jamshed, London (GB); Ayeesha Sachedina, New York, NY (US); Anna Xu, Charlotte, NC (US); Brandon Castagna, Charlotte, NC (US); Sasikumar Sivaraman, Charlotte, NC (US); Lauren Hewings, New York, NY (US); Alex Wong, London (GB)

(73) Assignee: Bank of America Corporation, Charlotte, NC (US)

( * ) Notice: Subject to any disclaimer, the term of this patent is extended or adjusted under 35 U.S.C. 154(b) by 186 days.

(21) Appl. No.: 17/037,042

(22) Filed: Sep. 29, 2020

(65) Prior Publication Data

US 2022/0101302 A1 Mar. 31, 2022

(51) Int. Cl.
*G06Q 20/30* (2012.01)
*G06Q 20/32* (2012.01)
(Continued)

(52) U.S. Cl.
CPC ....... *G06Q 20/3229* (2013.01); *G06Q 20/027* (2013.01); *G06Q 20/4012* (2013.01); *G16Y 20/40* (2020.01)

(58) Field of Classification Search
CPC ............. G06Q 20/3229; G06Q 20/027; G06Q 20/4012; G06Q 20/308; G06Q 20/3221;
(Continued)

(56) References Cited

U.S. PATENT DOCUMENTS 7,676,431 B2 3/2010 O'Leary et al.
8,955,067 B2 2/2015 Chermside
(Continued)

FOREIGN PATENT DOCUMENTS

CN 111324879 A * 6/2020
EP 3139329 A1 * 3/2017 ........... G06Q 20/027
(Continued)

OTHER PUBLICATIONS

"Know you customer (KYC) implementation with smart contracts on a privacy-oriented decentralized architecture", Nikolaos Kapsoulis, Future Internet 2020, 12, 41, Feb. 24, 2020 (Year: 2020).*

(Continued)

*Primary Examiner* — Neha Patel
*Assistant Examiner* — Duan Zhang
(74) *Attorney, Agent, or Firm* — Weiss & Arons LLP

(57) ABSTRACT

A method for harnessing a connected network to securely verify and execute a transaction is provided. The method may include requesting a PIN from a mobile device. The request may be transmitted via a USSD message. The method may also include receiving the PIN from the mobile device. The PIN may be received via a response to the USSD message. The method may also include authenticating the mobile device. The method may also include accessing a third-party network to verify an authentication status of the mobile device. The third-party network may include a plurality of IoT endpoints. Each IoT endpoint may include a stored verification usage process. The stored verification usage process may relate to a user associated with the mobile device. The method may also include executing the transaction upon receipt of an authentication signal from the third-party network.

5 Claims, 9 Drawing Sheets

(51) Int. Cl.
*G16Y 20/40* (2020.01)
*G06Q 20/02* (2012.01)
*G06Q 20/40* (2012.01)

(58) Field of Classification Search
CPC ......... G06Q 20/40145; G06Q 20/4014; G16Y 20/40
See application file for complete search history.

(56) References Cited

U.S. PATENT DOCUMENTS

| | | | |
|---|---|---|---|
| 10,121,186 B2 | 11/2018 | Isaacson et al. | |
| 10,187,295 B2 | 1/2019 | Carney | |
| 10,783,518 B1* | 9/2020 | Pearce | G06Q 20/401 |
| 11,188,523 B1* | 11/2021 | Harold | H04L 9/0869 |
| 2004/0226992 A1* | 11/2004 | Imanishi | G07F 7/1025 |
| | | | 235/379 |
| 2014/0164254 A1* | 6/2014 | Dimmick | G06Q 20/36 |
| | | | 705/44 |
| 2017/0270493 A1 | 9/2017 | Lugli et al. | |
| 2017/0331815 A1* | 11/2017 | Pawar | H04L 63/083 |
| 2019/0220853 A1 | 7/2019 | Srinivasan et al. | |
| 2019/0230070 A1 | 7/2019 | Isaacson et al. | |
| 2019/0355047 A1 | 11/2019 | Scipioni | |
| 2019/0385159 A1 | 12/2019 | Beatty et al. | |
| 2020/0106757 A1 | 4/2020 | De Ganon et al. | |
| 2021/0342850 A1* | 11/2021 | Kumar | G06Q 20/3821 |

FOREIGN PATENT DOCUMENTS

| | | | | |
|---|---|---|---|---|
| WO | WO-2010131989 A1 * | 11/2010 | .......... | H04W 76/027 |
| WO | WO-2019157267 A1 * | 8/2019 | ............ | G06F 16/27 |

OTHER PUBLICATIONS

John Mitchell, "How PSD2 and Global Open Banking Affect the US," https://www.paymentsjournal.com/psd2-global-open-banking-affect-us/, Payments Journal, Mar. 7, 2018.
"PSD2," https://www.iovation.com/topics/psd2, TransUnion LLC, Retrieved on Sep. 1, 2020.
"TrueLayer Company Profile," https://truelayer.com/, Retrieved on Sep. 1, 2020.
"What is USSD-MMI Code-USSD Code?" https://www.cspsprotocol.com/ussd/, CsPsProtocol, Retrieved on Sep. 1, 2020.

* cited by examiner

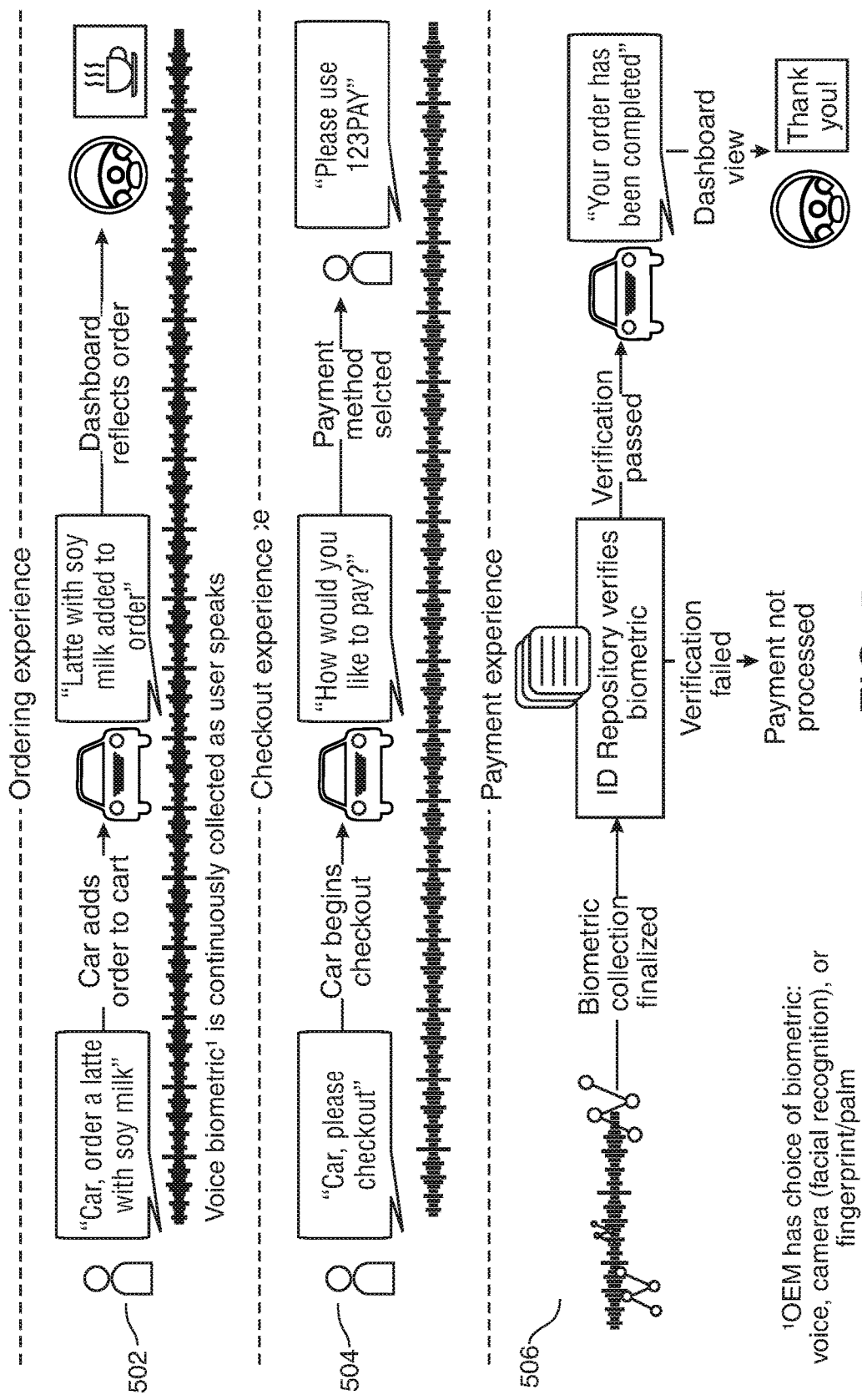

SYSTEM FOR HARNESSING A CONNECTED NETWORK TO SECURELY VERIFY A TRANSACTION

FIELD OF TECHNOLOGY

Aspects of the disclosure relate to debit transaction processing.

BACKGROUND OF THE DISCLOSURE

In recent years, payment methods have evolved. Payment methods have changed from cash payments and traditional credit/debit card payments to NFC mobile wallet-based payments, automated clearing house ("ACH") payments and other current payment technologies.

All of the new payment methods typically involve multiple components. These components may include a payment component, a security component and a data element component. Many times, the payment component, security component and data element component are developed independent of one other. Often, a user payment experience faces challenges because of the lack of unity between the structural components.

Many entities have attempted to resolve this problem. In fact, many entities have developed their own payment structure with its unique, unified components. However, these entities unique payment structure typically rely on a single ecosystem to function. As such, these payment structures are limited in the scope of their application.

The following are other shortcomings that are found in each component of current payment structures.

Shortcomings associated with existing payment components—i.e., the transfer of money component—include the following: Current payment methods do not settle instantly. As such, current payment components increase a level of uncertainty for merchants. Because these components lack information regarding the transaction settlement.

In addition, many times, card payments require manual card detail input. This manual input leads to a cumbersome and time-intensive experience for customers. This manual input may also lead to abandoned purchases.

Current payment methods include expensive interchange fees for merchants. Additionally, little effort is placed on enhancing non-card transactions. Accordingly, existing payment components do not compare favorably to card payments.

Shortcomings associated with existing security methods include the following: There are inconsistent user experiences across different payment channels. The authentication occurs via a mix of biometrics, one-time personal identification numbers ("PINs"), security devices and passwords. Consolidated authentication experiences are tied to a single ecosystem, and therefore, are not universal across various payment channels. Security often relies heavily on the internet, which increases the chance of fraud and hacking.

Shortcomings associated with existing data methods include the following: Data is often available in dispersed and unconnected sources. This leads to users continuously inputting details in various use cases. There is no current way to determine whether user data is out of date. Also, data security requirements, including the General Data Protection Regulation ("GDPR") and Payment Services Directive 2 ("PSD2"), have increased the need to ultra-secure data storage, with control of the data available only to the data owner.

Therefore, the need exists for a system that provides cross-channel, identity-based payments. A further need exists for a system that processes cross-channel, identity-based payments.

SUMMARY OF THE DISCLOSURE

A cross-channel, identity-based payment system, according to the disclosure, may include at least three parts. The system may include a pay-by-bank alternative payment architecture. The system may also include a unique authentication method that can function in substantially all channels and geographies. The system may also include a secure third-party managed cloud-based identifier repository that can store payer and payee details.

The identifier repository may enable data owners to directly edit, update and delete their own data. Data stored in the identifier repository may be stored in a consistent format. As such, disparate entities may access the repository to process transactions and authenticate customers.

Examples of data included in the identifier repository may include, name, address, demographics, bank account number, bank account preference ranking, details for tax filing, merchant loyalty points, membership numbers, car data inputs, such as haptics and driving patterns, know your customer ("KYC") data, insurance data, geolocation data, user interest data points, previous transaction behavior and aliases for payments (e.g., phone number, email address and social media handles).

The pay-by-bank architecture may utilize application programming interfaces ("APIs") to enable users to make account-to-account payments. In some embodiments, these payments can be made directly from a bank account.

These APIs may also enable a user to log into, and authenticate directly, from a web portal associated with their bank account. The pay-by-bank architecture may also tokenize the bank account in order to provide portability for the pay-by-bank option. Tokenization may be a process that substitutes sensitive data elements, such as bank account data, with non-sensitive data equivalents, also referred to as tokens. The tokens have no exploitable meaning or value. The token is a reference that refers back to the sensitive data through a tokenization system. Therefore, the pay-by-bank option may be deployed in any channel. Because the pay-by-bank option may be deployed in any channel, it enables additional authentication methods to be deployed.

The unique authentication methods may include authentication via a PIN or phrase. The authentication may utilize an unstructured supplementary service data ("USSD") rail telecom signal system. The USSD rail telecom signal system may be transmitted by telecom towers that coordinate signals between endpoints. Messages transmitted over the USSD rails completely bypass the internet. As such, messages transmitted over the USSD rails can be transmitted in roaming scenarios around the world. Also, messages transmitted over the USSD rails can work in all kinds of devices that include a subscriber identity module ("SIM") card, such as cell phones and cars.

PIN entry into a USSD message may be confirmed directly. Additionally, incorrect PIN input responses can initiate real-time or delayed re-try attempts and/or a PIN reset process.

It should be appreciated that no user interface is required to be build is required to condition a device to receive a USSD message. This is because every device that includes a SIM card is conditioned to show USSD signal messages above all other screens. Therefore, a PIN can be input without unlocking the device.

The unique authentication methods may also include authenticating transactions via an identifier repository.

An identifier repository may enable access, in various instances, to details relevant to payment or authentication. The identifier repository may allow data to be centrally updated in a consistent format. The identifier repository may incorporate user preferences and provide data control to the data owner. The identifier repository may enable a data owner to utilize the stored data, such as biometric data to improve payment authentication. Additionally, the identifier repository may store payer and/or payee preferences.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 5 shows yet another illustrative diagram in accordance with principles of the disclosure;

DETAILED DESCRIPTION OF THE DISCLOSURE

Figure 1:
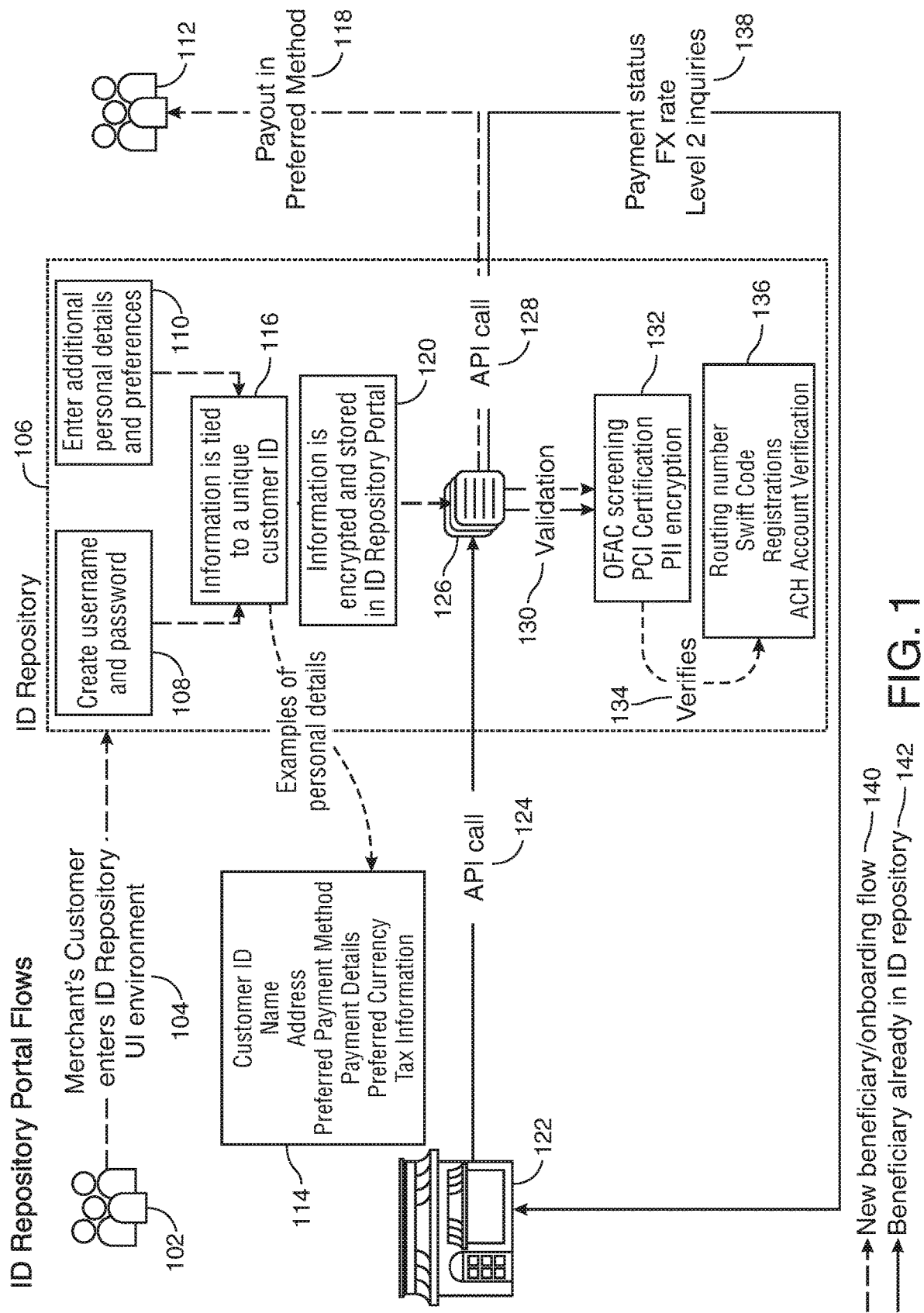
FIG. 1 shows an illustrative flow diagram in accordance with principles of the disclosure.

Apparatus, methods and systems for harnessing a connected network to securely verify and execute a transaction are provided.

Such a system may include a transaction processor. The transaction processor may be operable to execute a transaction.

The system may also include a user interface. The user interface may operate on a point-of-sale device. The user interface may provide a front-end for the transaction processor.

The system may also include a second user interface. The second user interface may operate on a mobile device. The second user interface may receive input relating to the transaction.

The system may also include a first line of communication. The first line of communication may link a USSD rail processor and the transaction processor.

The system may also include a second line of communication. The second line of communication may link the USSD rail processor to the user interface on the mobile device.

The system may also include a third line of communication. The third line of communication may link the user interface on the mobile device to the connected identifier repository.

The system may also include a fourth line of communication. The fourth line of communication may link the transaction processor to the connected identifier repository.

The transaction may be initiated at the user interface on the point-of-sale device. The transaction processor may transmit a message from the USSD rail processor over the first line of communication. The message may include transaction details. The transaction details may include a phone number associated with the mobile device, an amount of the transaction, a date of the transaction and a timestamp of the transaction.

In response to receipt of the message from the transaction processor, the USSD rail processor may transmit a push notification to the user interface on the mobile device. The push notification may be transmitted over the second line of communication. The push notification may request entry of a PIN and/or phrase on the user interface of the mobile device. The entry of the PIN and/or phrase may be a textual input and/or a verbal input.

The USSD rail processor may receive the PIN and/or phrase via the second line of communication.

The USSD rail processor may verify the PIN and/or phrase. Upon verification, the USSD rail processor may transmit the verification to the transaction processor via the first line of communication.

In response to receipt of the verification from the USSD rail processor, the transaction processor may instruct the user interface on the mobile device to verify a user identity using the connected identifier repository.

The user interface on the mobile device may communicate with the connected identifier repository to verify the user via the third line of communication.

The connected identifier repository may verify the user by communicating with a plurality of internet-of-things ("IoT") endpoints. Each of the IoT endpoints may include a stored verification usage system, or implement a stored verification usage method, relating to the user. Each of the IoT endpoints may store data relating to the user.

The connected identifier repository may transmit the verification to the transaction processor via the fourth line of communication.

Upon receipt of the verification from the USSD rail processor and upon receipt of the verification from the connected identifier repository, the transaction processor may execute the transaction.

It should be appreciated that, in some instances, the transaction processor may instruct the user interface to verify the user independent of a verification receipt from the USSD rail processor. As such, in some instances the transaction processor may instruct the user interface to verify the user before receiving verification from the USSD rail. In yet other instances, the transmission of a push notification from the USSD rail processor may be in response to a connected identity verification received from the mobile device.

In some embodiments, the transaction may be rated on an impact scale. In such embodiments, the connected identifier repository may transmit a percentage of certainty relating to the verification. The transaction may be executed when the percentage of certainty is above a predetermined threshold level with respect to the impact scale.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative flow diagram. The illustrative flow diagram includes multiple flows associated with the identifier ("ID") repository portal. The ID repository may include communications with multiple IoT endpoints. The communications may be used to verify the identity of a user. It should be appreciated that the flow indicated by the long dash, shown at 140, shows a new beneficiary flow, which may also be known as an onboarding flow. Also, the flow indicated by a solid line, shown at 142, shows the flow of a beneficiary already recorded in the ID repository.

A merchant, also referred to herein as a client of a financial institution, may want to receive payment from customers via a payment method that utilizes the ID repository. As such, the merchant may onboard its customers to register in the ID repository. During the onboarding, the merchant may guide his customer to access the user interface environment associated with the ID repository, as shown at 102 and 104.

Within the ID repository environment, the customer may be requested to create a username and password, as shown at 108. The customer may also enter additional personal details and/or preferences, as shown at 110. A unique customer identifier may be generated for the customer. The personal information, which may include the username, the password, the personal details and the preferences may be tied to the unique customer identifier, as shown at 116. Examples of personal details may include customer identifier, name, address, preferred payment method, payment details, preferred currency and tax information, as shown at 114. The personal information may be encrypted and stored in an identifier repository portal, as shown at 120.

Identifier repository 126 may perform a validation, as shown at 130. The validation may include office of foreign assets control ("OFAC") screening, payment card industry ("PCI") certification and personally identifiable information ("PII") encryption. Additionally, as shown at 134 and 136, a routing number verification, a swift code verification, a registrations verification and an automated clearing house ("ACH") account verification may be executed.

Upon the validation shown at 134 and 136, identifier repository 126 may generate application programming interface ("API") call 128. API call 128 may generate a payout in the preferred method, as shown at 118 and 112.

The following flow may occur when a customer is already stored in the identifier repository. A transaction may be initiated between a customer and a merchant at point-of-sale 122. The merchant may generate API call 124. API call 124 may initiate identifier repository 126 to validate customer identification details included in the transaction. Identifier repository 126 may perform the validation, as shown at 130. The validation may include OFAC screening, PCI certification and PII encryption. Additionally, as shown at 134 and 136, routing number verification, swift code verification, registrations verification and ACH account verification may be executed.

Upon verification, API call 128 that includes payment status, foreign exchange rate ("FX") rate and level 2 inquiries, as shown at 138, may be transmitted back to merchant 122.

Figure 2:
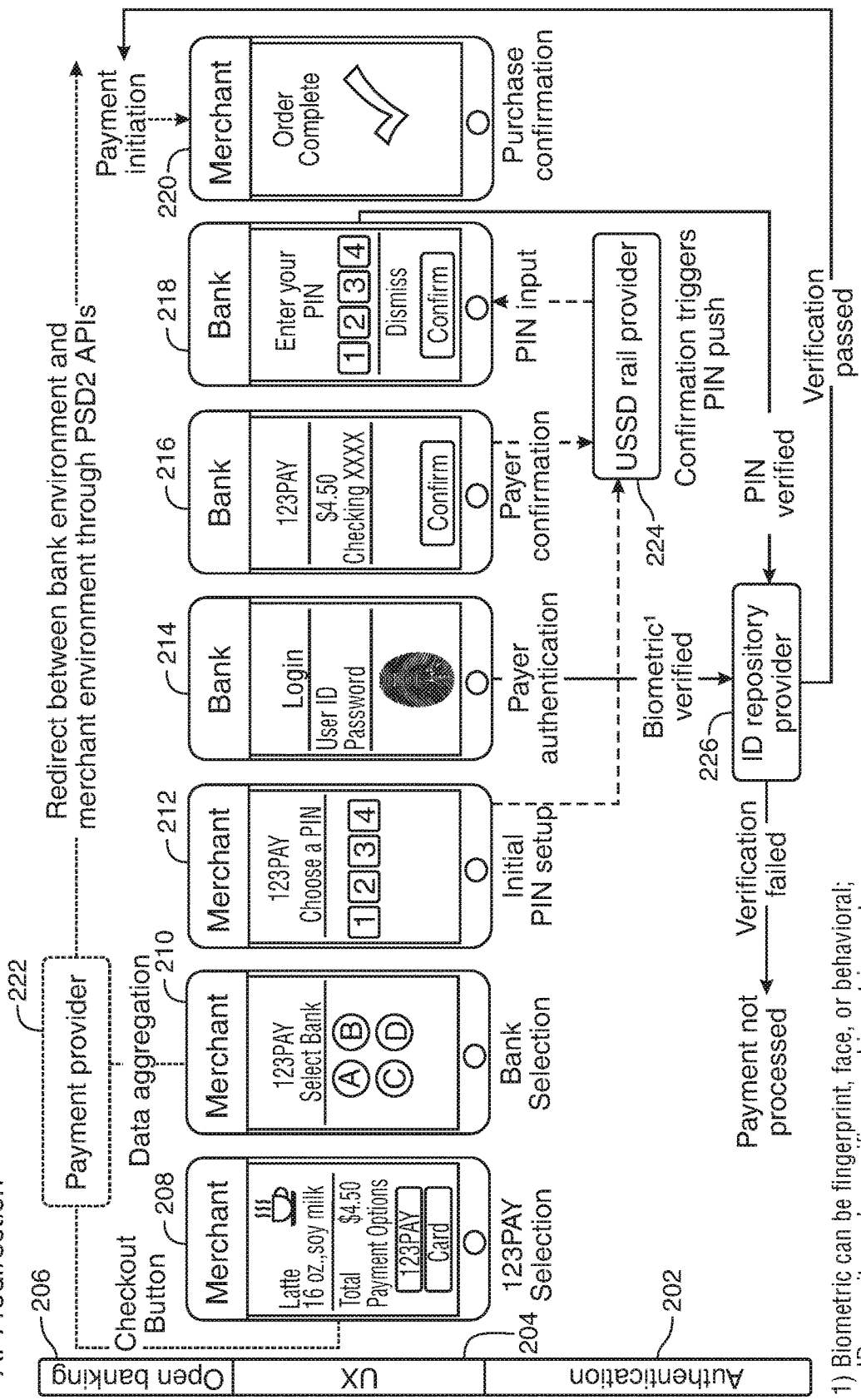
FIG. 2 shows an illustrative diagram in accordance with principles of the disclosure.

FIG. 2 shows an illustrative diagram. The illustrative diagram shows a first sample user flow. The first sample user flow may show a tripartite mobile/online architecture. The diagram shows API redirection.

The flow diagram may include three swim lanes. A first swim lane may be an authentication swim lane, shown at 202. The authentication swim lane may include details relating to authenticating a transaction.

A second swim lane may be a user experience ("UX") swim lane, shown at 204. A UX may also be referred to herein as a user interface ("UI"). The UX swim lane may include screenshots relating to the customer experience on the merchant environment and the financial institution environment.

A third swim lane, shown at 206, may be an open banking swim lane. The open banking swim lane may include details relating to the payment provider and the redirection between the financial institution environment and the merchant environment.

Merchant environment screenshot 208 shows a customer ordered a 16 oz. latte with soy milk. The total payment amount shown may be $4.50. The payment options may include a 123PAY option and a card option. The user may select the checkout button with the 123PAY option. Upon selection of the checkout button, details of the transaction and beneficiary details (merchant bank account details) may be transmitted to payment provider 222. Payment provider 222 may initiate the transaction. Also, upon selection, of the 123PAY option, the user may be directed to screenshot 210.

Merchant environment screenshot 210 may enable the user to select a bank. The available bank options for selection may include banks A, B, C and D. Data aggregation may be executed at the open banking layer before merchant environment screenshot 210 being displayed to the user. The data aggregation may include vendor connection to multiple financial institution APIs to enable the customer to select from a plurality of banks. In some embodiments, bank selection may be previously stored for a specific customer within the merchant environment. As such, a bank selection screen may not be displayed.

Upon selection of a bank on merchant environment screenshot 210, a user may be directed to merchant environment screenshot 212. Merchant environment screenshot 212 may prompt the user to select a PIN. It should be appreciated that the PIN selection may be displayed the first time the user selects 123PAY. However, in subsequent transactions that utilize 123PAY, a PIN selection screen may be not be displayed.

Upon selection of a PIN, the PIN may be transmitted to USSD rail provider 224. USSD rail provider 224 may store the PIN for user verification at a later stage in the transaction flow. In some instances, the PIN verification may be performed at the PIN selection stage and at a later stage in the transaction flow.

Also, upon selection of a PIN, the user may be directed to bank environment screenshot 214. It should be appreciated that payment provider 222 may provide the backend for API redirection. The backend API redirection may redirect a user from a merchant environment to a bank environment, and from the bank environment back to the merchant environment. The redirection may be implemented through PSD2 APIs.

Bank environment screenshot 214 may perform a payer authentication. The payer authentication may include entry of a username and password as well as entry of one or more biometric identifiers. The username, password and biometric identifiers may be transmitted to ID repository provider 226 for verification. It should be appreciated that, as shown at footnote 1, biometric identifiers may include one or more of fingerprint, face or behavioral biometrics. Additionally, ID repository provider 226 may include verification of non-biometric customer identity data, such as geolocation.

ID repository provider 226 may be in communication with multiple IoT endpoints. IoT endpoints may include, for example, a computing device, such as a mobile device, a personal computer ("PC"), smartphone, smartwatch and tablet. IoT endpoints may also include a coffee machine, car, cigarette lighter, home or office security system, one or more cameras, keys, pens and/or any other suitable IoT endpoints. Each of these endpoints may store data relating to one or more users. Each of these endpoints may be able to determine a degree of certainty that the user of the IoT device is indeed the user that he is purporting to be. As such, ID repository provider 226 may communicate with these endpoints and receive data from each of these endpoints. The data may include the time of the last contact between the user and the IoT endpoint, the degree of certainty that the IoT endpoint determines that the user is indeed the user he is purporting to be and any other suitable data.

The ID repository may aggregate the data received from the IoT endpoints. The ID repository may utilize the aggregated data to verify the user executing the transaction.

It should be appreciated that, in order to determine whether the customer is authenticated to execute the transaction, the ID repository may utilize the number of responses received from the IoT endpoints and the degree of certainty included in each of the received responses. It should be appreciated that various algorithms may be used to determine whether the customer is authenticated to execute the transaction. The algorithms may consider various variables. The variable may include, for example, total transaction amount, data received from the IoT endpoints, total number of transactions settled within a predetermined time period, such as a day or a week, and any other suitable variable. The following are illustrative exemplary algorithms: 1. A transaction with a total amount under $10.00 requests a first degree of user authentication. The first degree of user authentication may include greater than 70% degree of certainty received from at least one IoT device. 2. A transaction with a total amount between $10.00 and $100.00 requests a second degree of user authentication. The second degree of user authentication may include greater than 75% degree of certainty received from at least two IoT devices. 3. A transaction with a total amount of over $100.00 requests a third degree of user authentication. The third degree of user authentication may include greater than 85% degree of certainty received from at least four IoT devices.

Upon entry of the username, password and biometric identifier in payer authentication bank environment screenshot 214, the user may be directed to bank environment screenshot 216. Bank environment screenshot 216 may be a payer confirmation screenshot. Payer confirmation screenshot 216 may request a user to confirm the transaction.

Payer confirmation screenshot 216 may trigger USSD rail provider 224 to initiate the transmission of a confirmation message. The confirmation message may be transmitted to the mobile device associated with the transaction. The USSD rail provider may transmit a USSD message to the mobile device associated with the transaction. The USSD message may request input of a PIN from the mobile device. The USSD message may be a push notification. As such, once the correct PIN is received from the mobile device, the USSD message may be permanently deleted from the mobile device without leaving a footprint on the mobile device.

Upon successful entry of the PIN into the USSD message on the mobile device, a verification message may be transmitted to ID repository provider 226. ID repository provider 226 may, using the password, username and biometric identifier verification methods and the USSD verification method, determine a transaction verification status. The payment may not be processed in the event that the verification failed. The payment may be processed in the event that the verification passed.

Upon successful verification, payment provider 222 may initiate the payment upon completion of the transaction at the merchant device, as shown on merchant environment screenshot 220. Merchant environment screenshot may display a purchase confirmation to the merchant, as shown at 220.

Figure 3:
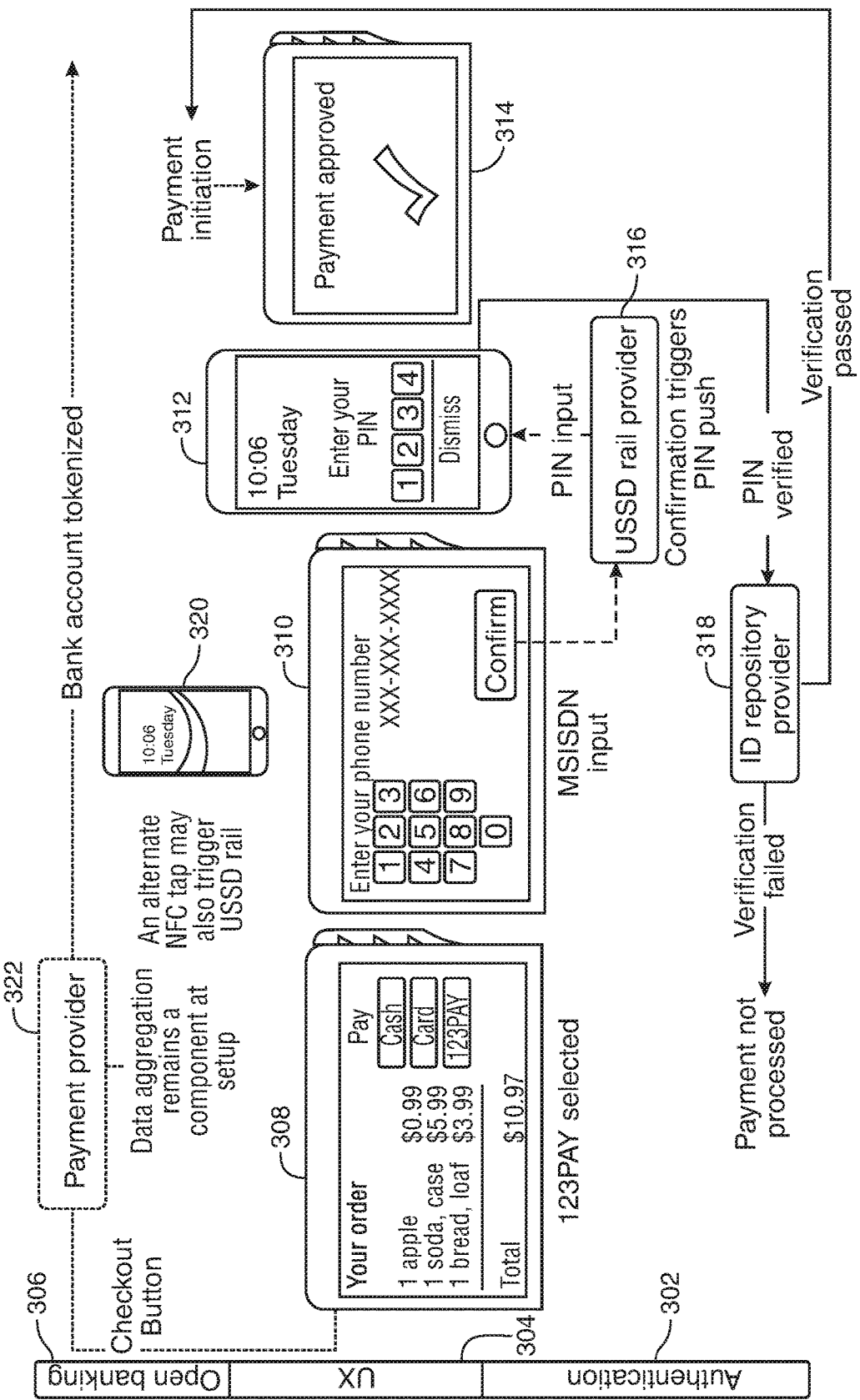
FIG. 3 shows another illustrative diagram in accordance with principles of the disclosure.

FIG. 3 shows an illustrative diagram. The illustrative diagram shows a second sample user flow. The second sample user flow shows a tripartite mobile/online architecture. The diagram shows Mobile Subscriber Integrated Services Digital Network Number ("MSISDN")—phone number use case. An MSISDN may be a number that identifies a subscription in a global system for mobile communications or a universal mobile telecommunications system mobile network. The MSISDN number may be the mapping of a mobile telephone number to the subscriber identity mobile in a mobile phone. In some instances, the MSISDN number may be the mobile telephone number.

The flow diagram may include three swim lanes. A first swim lane may be an authentication swim lane, shown at 302. The authentication swim lane may include details relating to authenticating a transaction.

A second swim lane may be a user experience ("UX") swim lane, shown at 304. A UX may also be referred to herein as a user interface ("UI"). The UX swim lane may include screenshots relating to the customer experience on the merchant environment and the financial institution environment.

A third swim lane, shown at 306, may be an open banking swim lane. The open banking swim lane may include details relating to the payment provider and the redirection between the financial institution environment and the merchant environment.

Merchant device screenshot 308 shows a customer ordered 1 apple, 1 case soda and 1 loaf of bread. The total payment amount shown may be $3.99. The payment options may include cash payment, card payment and 123PAY payment. Upon selection of the checkout button, payment provider 322 may be triggered. Payment provider 322 may perform data aggregation at the setup. The data aggregation may represent a process of aggregating multiple bank APIs into a plurality of bank APIs. A symbol representing each of the banks included in the plurality of bank APIs may be displayed to the customer. The customer may select one of the symbols that identifies a bank included in the plurality of bank APIs. Once a bank is selected, the customer may be directed to the selected bank's website. Payment provider 322 may also tokenize the bank account for further processing.

Upon selection of the 123PAY option, the user may be directed to merchant device screenshot 310. Merchant device screenshot 310 may prompt the user to enter a MSISDN, or mobile telephone number. Upon entry of the mobile telephone number and selection of the confirm button on merchant device screenshot 310 may prompt USSD rail provider to transmit a push notification to a mobile device associated with the entered phone number.

In some embodiments, as shown at 320, an alternate near field communication tap ("NFC") tap may trigger the USSD rail provider to transmit the push notification.

The user may receive the push notification on his personal mobile device, as shown at 312. The user may enter his PIN into the USSD message. Upon entry of the PIN, the PIN may be verified. Upon successful PIN verification, the successful PIN verification status may be transmitted to the ID repository provider 318.

ID repository provider 318 may verify the identity of the customer using one or more authentication methods. Such authentication methods may include the verification received from the USSD rail provider. Such authentication methods may also include user verification using a username, password and one or more biometric identifiers.

Upon successful verification at ID repository provider 318, the payment may be initiated. Upon successful completion of the payment, the payment may be approved, as shown at merchant device screenshot 314.

It should be appreciated that, instead of, or in addition to, a user interface on the mobile device, the ID repository provider may communicate with an email address or social media handle.

Figure 4:
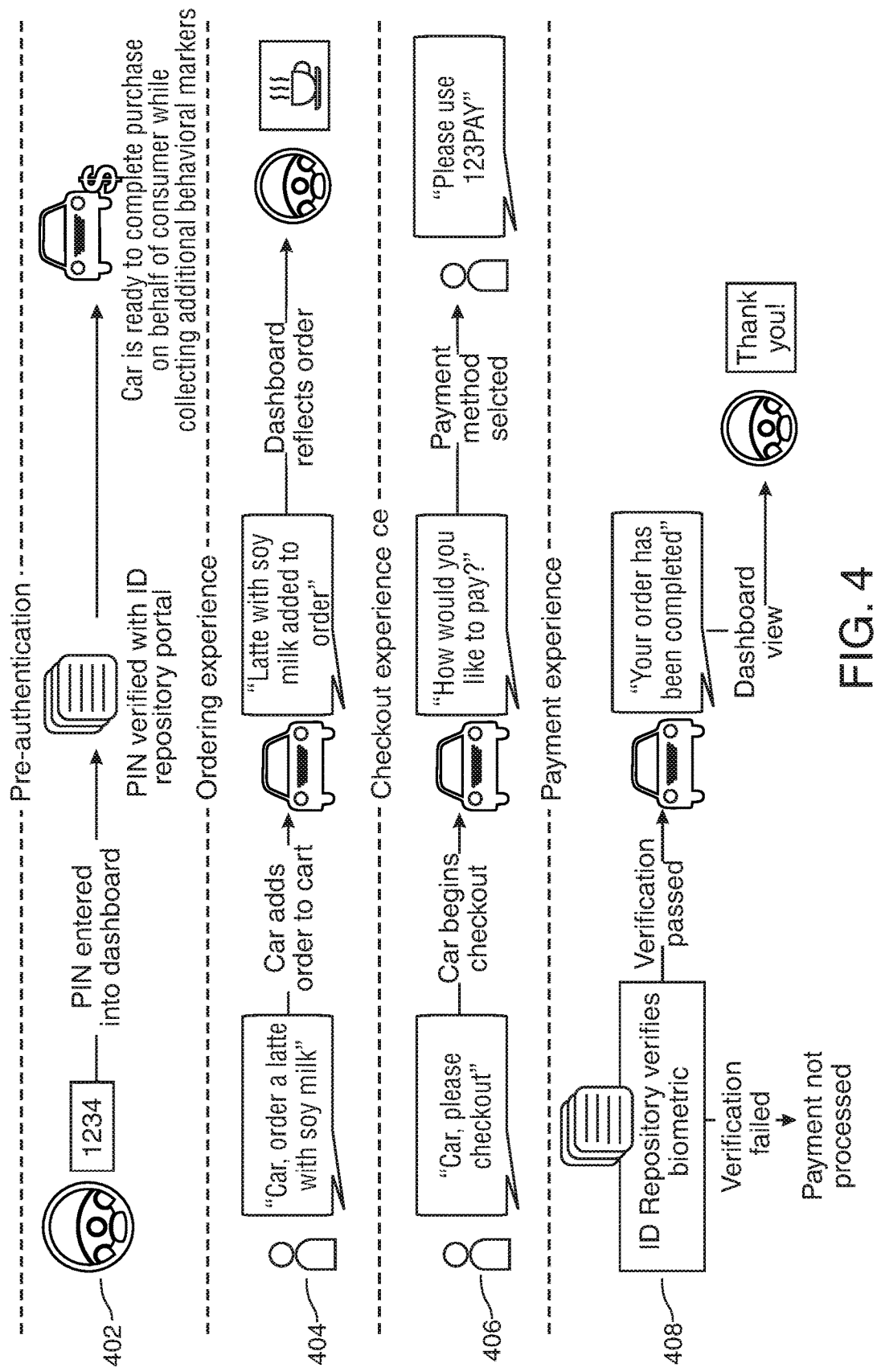
FIG. 4 shows still another illustrative diagram in accordance with principles of the disclosure.

FIG. 4 shows an illustrative diagram. The illustrative diagram shows a third sample user flow. The third sample user flows shows multiple car payment experiences.

Lane 402 shows an illustrative pre-authentication process. A PIN may be entered into a car dashboard. The car dashboard may verify the PIN with an ID repository portal. Upon verification, the car is ready to complete a purchase on behalf of the car operator. The car may also collect additional behavioral information relating to the car operator. Examples of behavioral information may include driving speed, speed of acceleration, speed of deceleration, car temperature, open/close status of one or more windows and car speaker volume.

The behavioral information may be used to verify the car operator's identity. The behavioral information may be compared to previously stored behavioral information. If the delta between the behavioral information stored previously and the current behavioral information represents a value greater than a predetermined threshold, the identity of the car operator may not be verified. If the delta is below a predetermined threshold, the identity of the car operator may be verified. The current behavioral data may also be stored as historical behavioral data for future comparisons.

Lane 404 shows an exemplary ordering experience. The ordering experience may include, receiving a verbal instruction from a car operator to order a latte with soy milk. The car may add the order to a virtual shopping cart. The car may verbally or textually respond that the latte with soy milk has been added to the order. The dashboard may reflect the order.

Lane 406 shows an exemplary checkout experience. The checkout experience may include, receiving a verbal instruction from a car operator to checkout. The car may begin checkout. The car may verbally or textually request from the user a payment method. The car operator may instruct the car to pay using the 123PAY payment method.

Lane 408 shows an exemplary payment experience. The ID repository may verify the biometric identifier of the car operator using data received from various IoT endpoints. In this scenario, one IoT endpoint may be the car. If the verification fails, the payment is not processed. If the verification is successful, the order is completed. The car may verbally or textually inform the car operator that the order has been completed. The dashboard may display order completion.

FIG. 5 shows an illustrative diagram. The illustrative diagram shows a fourth sample user flow. The fourth sample user flow shows multiple car payment experiences.

Lane 502 shows an illustrative ordering experience process. It should be appreciated that, during the ordering experience, a voice biometric is continuously collected as the user speaks. A car operator may instruct a car to order to order a latte with soy milk. The car may add the order to the cart. The car may inform the car operator, either using text or audio, that the latte with soy milk was added to an order. The car dashboard may reflect the order.

It should also be appreciated that a PIN entry may not be used in every experience. Specifically, when a predetermined number of biometric identifiers are received, a PIN entry may not be utilized.

Lane 504 shows an illustrative checkout experience. The car operator may instruct the car to checkout. The car may begin to checkout. The car may, verbally or textually, request a payment method from the car operator. The car operator may select 123PAY.

Lane 506 shows an illustrative payment experience. The biometric collection may be finalized at the point of payment. The biometric collection or a binary verification status may be transmitted to the ID repository. The ID repository may verify the car operator based on the biometric collection or the binary verification status received from the car. Failed verification may result in non-processing of the payment. Successful verification may result in the ordering being completed. The dashboard may display the completion of the order.

Figure 6A:
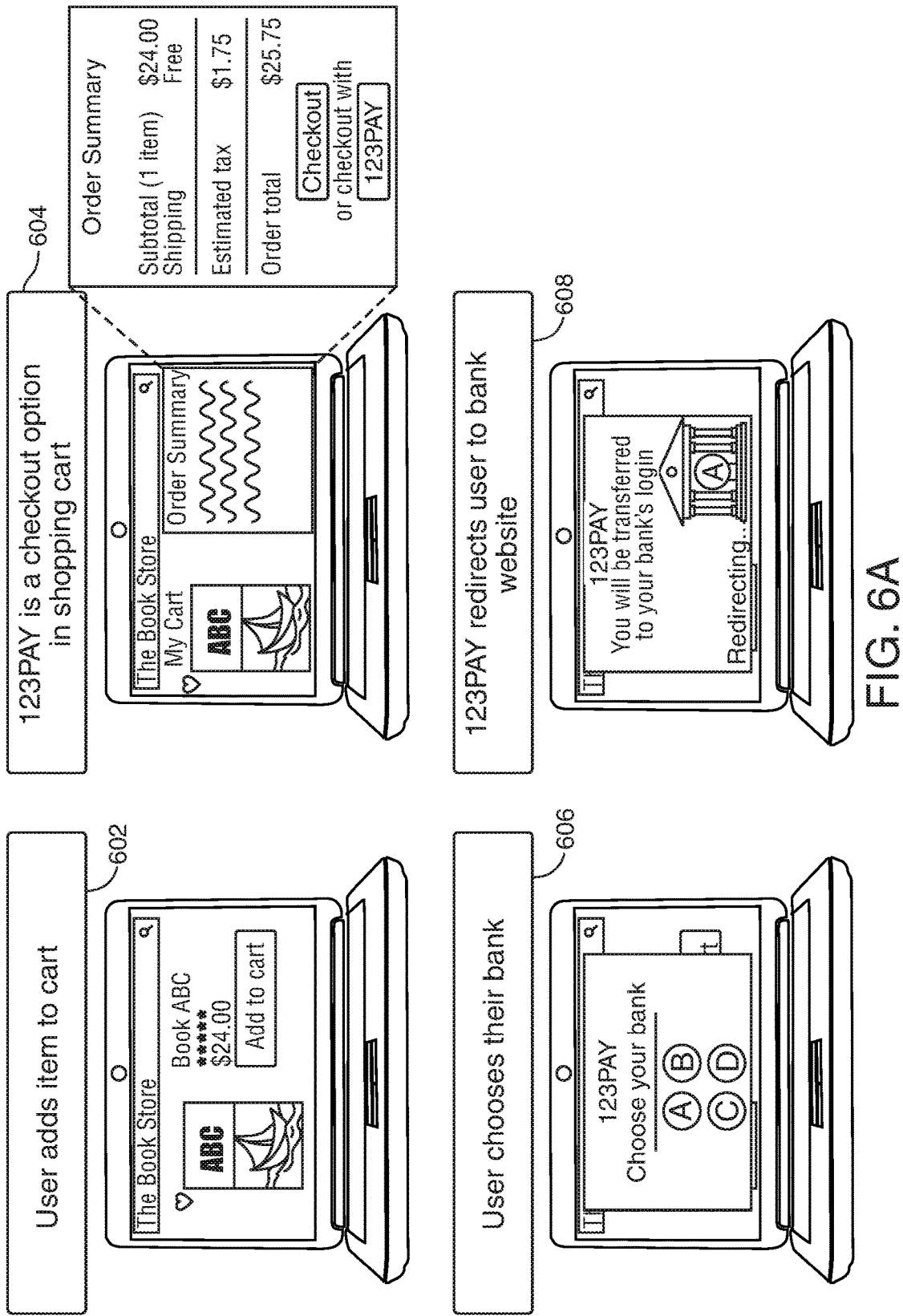
FIGS. 6A and 6B show an illustrative diagram in accordance with principles of the disclosure.
Figure 6B:
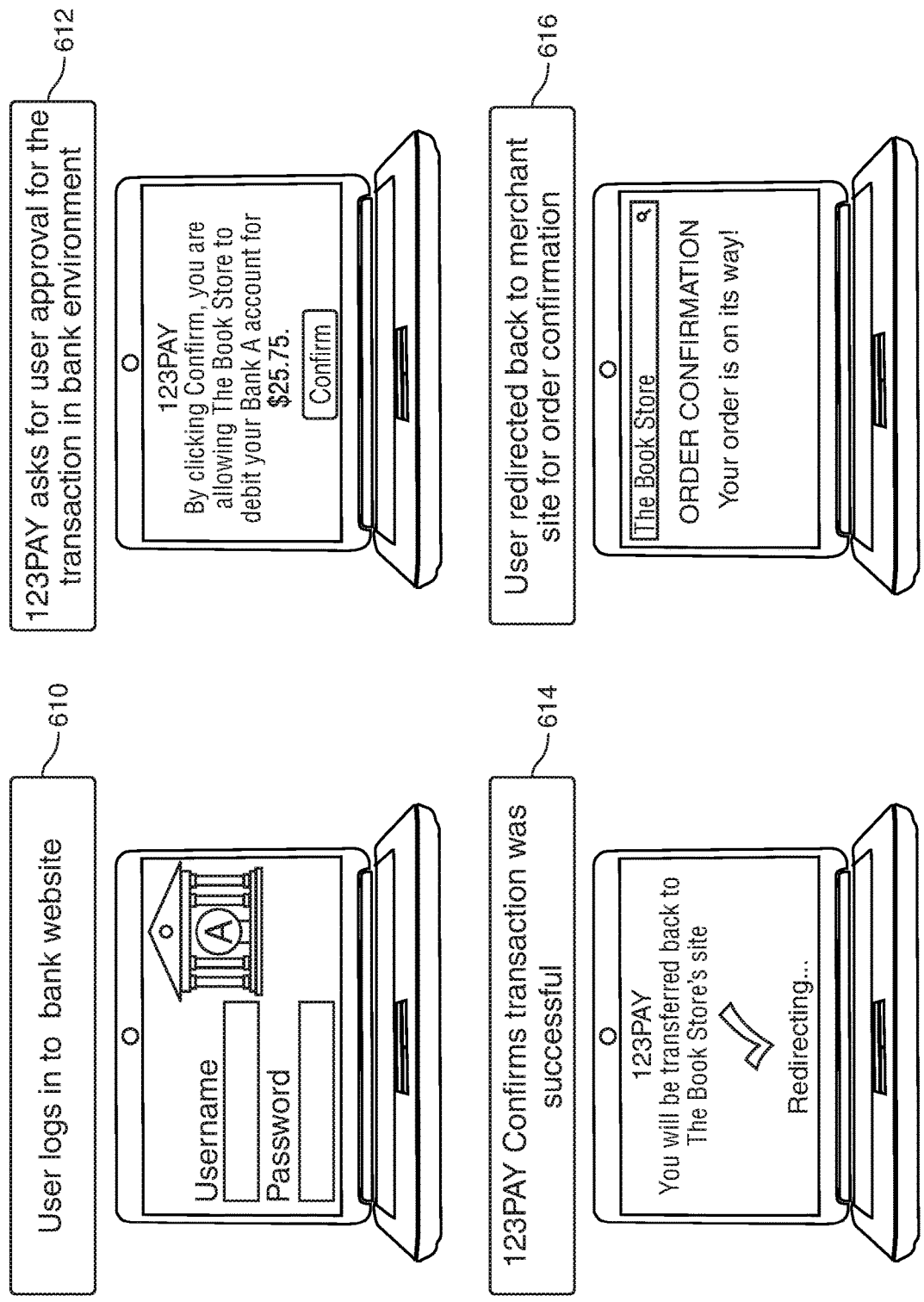

FIGS. 6A and 6B show an illustrative diagram. The illustrative diagrams show a fifth sample user flow. The fifth sample user flow show an online experience on a merchant website.

On a merchant website, a user may add an item to a cart, as shown at 602. As shown at 604, 123PAY is a checkout option in the shopping cart. Upon selection of 123PAY, a user is instructed to select a bank, as shown at 606. The 123PAY option redirects the user to the bank website, as shown at 608.

The user may log into the bank website by entering a username and password, as shown at 610. The 123PAY may ask for user approval for the transaction in the bank environment, as shown at 612. 123PAY may confirm that the transaction was successful, as shown at 614. The user may be redirected back to a merchant site for order confirmation, as shown at 616.

Figure 7:
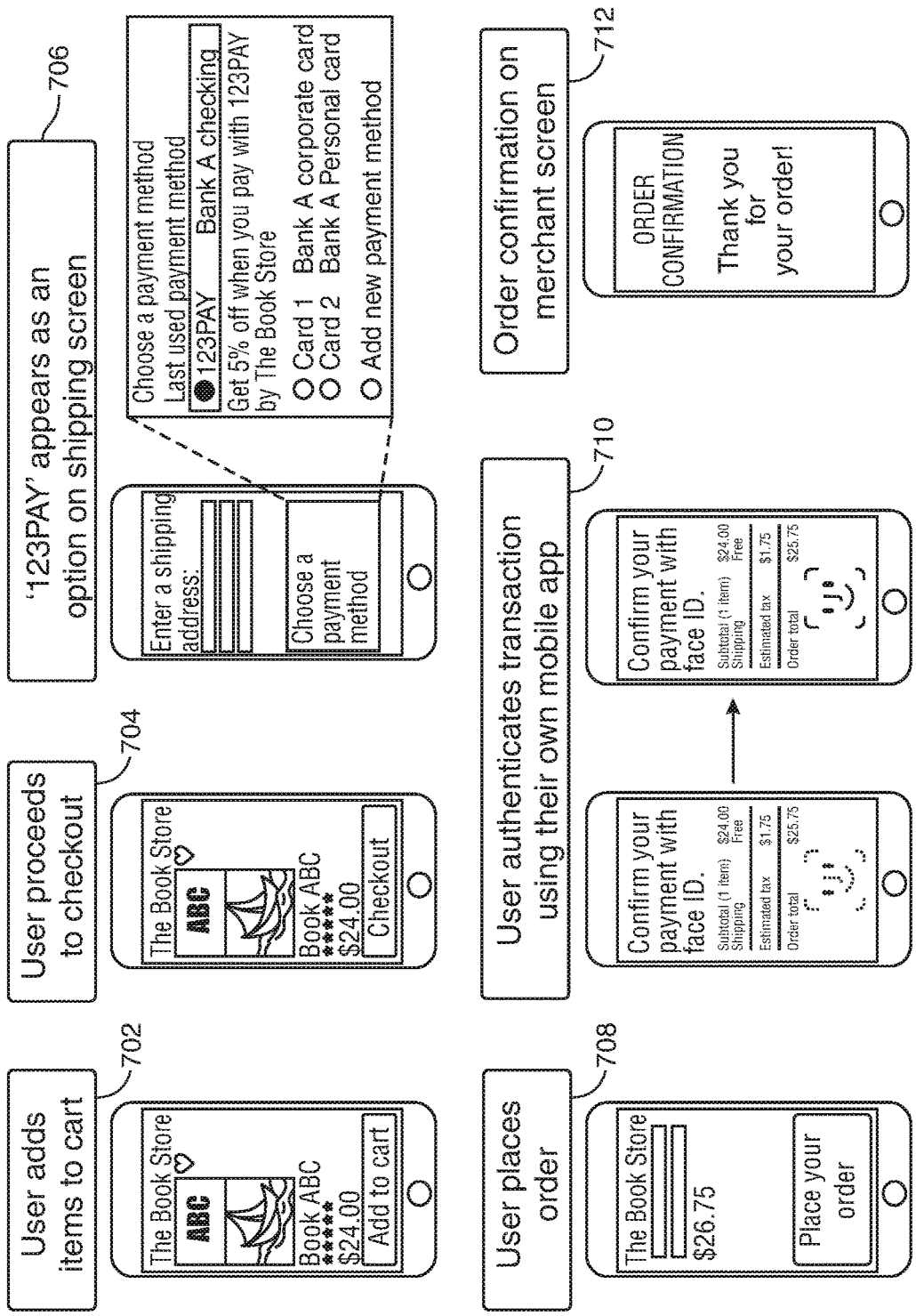
FIG. 7 shows another illustrative diagram in accordance with principles of the disclosure.

FIG. 7 shows an illustrative diagram. The illustrative diagram shows a sixth sample user flow. The sixth sample user flow shows a mobile experience on a merchant website.

On a merchant website displayed on a user mobile device, a user may add items to a virtual shopping cart, as shown at 702. The user may proceed to checkout, as shown at 704.

At the checkout screen, 123PAY may be a payment option on the shipping/checkout screen, as shown at 706. The user may select the 123PAY option, and place the order, as shown at 708.

The user may authenticate the transaction using their own mobile app, as shown at 710. The authentication may be a biometric authentication. The biometric authentication shown is a face identifier. Any other suitable biometric identifier may be used.

The order may be confirmed on the merchant website displayed on the user's mobile device, as shown at 712.

Figure 8:
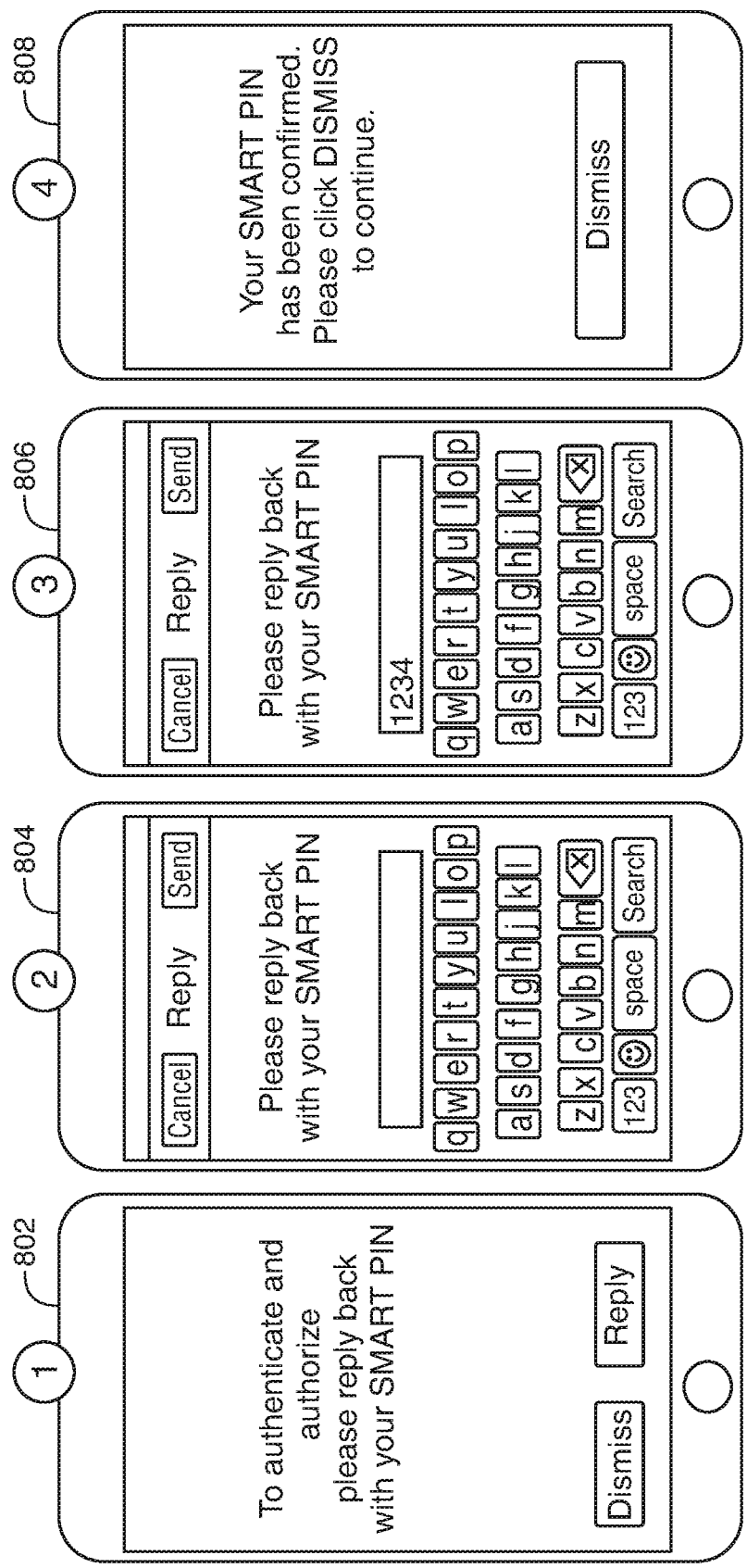
FIG. 8 shows yet another illustrative diagram in accordance with principles of the disclosure.

FIG. 8 shows an illustrative diagram. The illustrative diagram shows a sixth sample user flow. The sixth sample user flow shows a USSD message received, and responded to, on a user's mobile device.

Screenshot 802 shows a USSD message. The USSD message requests the user to reply back with a SMART PIN in order to authenticate and authorize a transaction. In order to dismiss the message without replying, the user may select dismiss. In order to reply to the message, the user may select reply. Upon selection of the reply button, a user may be directed to screenshot 804.

Screenshot 804 enables the user to enter a SMART PIN using a keypad. Screenshot 806 shows user entry of the SMART PIN: 1234. Upon entry of the SMART PIN 1234, the user may select the send button. Upon selection of the send button, the user may be directed to screenshot 808.

Screenshot 808 may inform the user that the SMART PIN has been confirmed. The user may be instructed to select the dismiss button in order to continue using the device. It should be appreciated that, because the USSD message communicates directly with the firmware on the mobile device, once the SMART PIN has been transmitted, the USSD message is not stored within the mobile device's storage and therefore does it leave a footprint on the mobile device.

Thus, a system for harnessing a connected network to securely verify a transaction is provided. Persons skilled in the art will appreciate that the present invention can be practiced by other than the described embodiments, which are presented for purposes of illustration rather than of limitation. The present invention is limited only by the claims that follow.

What is claimed is:

1. A system for harnessing a connected identifier repository to securely verify and execute a transaction, the system comprising:
a transaction processor operable to execute a transaction;
a user interface on a point-of-sale device, said user interface providing a front-end for the transaction processor;
a user interface on a mobile device operable to receive user input relating to the transaction;
a connected identifier repository, the connected identifier repository configured to:
store transaction data in a consistent format, the transaction data comprising:
a name, address, account number and one or more know your customer ("KYC") data elements of a payer;
a name, address, account number and one or more know your customer ("KYC") data elements of a payee;
enable a plurality of data owners to directly edit, update and delete data owned by each of a plurality of data owners, said plurality of data owners comprising the payer and the payee;
a first line of communication with an unstructured supplementary service data ("USSD") rail processor, said first line of communication that links the USSD rail processor to the transaction processor;
a second line of communication, said second line of communication that links the USSD rail processor to the user interface on the mobile device;
a third line of communication, said third line of communication that links the user interface on the mobile device to the connected identifier repository;
a fourth line of communication, said fourth line of communication that links the transaction processor to the connected identifier repository;
wherein:
the transaction is initiated at the user interface on the point-of-sale device;
the transaction processor transmits a message to the USSD rail processor over the first line of communication, the message comprising transaction details, said transaction details comprising a phone number associated with the mobile device;
the USSD rail processor transmits, in response to receipt of the message from the transaction processor, a push notification to the user interface on the mobile device via the second line of communication, said push notification requesting entry of a personal identification number ("PIN") and/or phrase on the user interface of the mobile device;
the USSD rail processor receives the personal identification number and/or phrase via the second line of communication;
the USSD rail processor executes a verification of the personal identification number and/or phrase, and transmits the verification to the transaction processor via the first line of communication;
the transaction processor instructs the user interface on the mobile device to verify, using the connected identifier repository, a user identity;
the user interface on the mobile device communicates with, and retrieves transaction data from, the connected identifier repository to verify the user identity via the third line of communication;
the connected identifier repository verifies the user identity by communicating with a plurality of internet-of-things endpoints, each of the internet-of-things endpoints that comprises a stored verification usage process relating to the user identity;
the connected identifier repository transmits the verification to the transaction processor via the fourth line of communication; and
upon receipt of the verification from the USSD rail processor via the first line of communication and upon receipt of the verification from the connected identifier repository via the fourth line of communication, the transaction processor executes the transaction.

2. The system of claim 1, wherein the transaction details further comprise an amount, a date and a timestamp.

3. The system of claim 1, wherein each of the internet-of-things endpoints stores data relating to the user identity.

4. The system of claim 1, wherein:
the transaction is rated on an impact scale;
the connected identifier repository transmits a percentage of certainty relating to the verification; and
the transaction is executed when the percentage of certainty is above a predetermined threshold level with respect to the impact scale.

5. The system of claim 1, wherein the USSD rail processor transmits the push notification to the mobile device and receives the PIN and/or phrase from the mobile device via a subscriber identity module ("SIM") card included in the mobile device.

* * * * *